July 26, 1938.　　　O. A. KOTTEMANN　　　2,124,783
HIGH LEVEL SAFETY CHECK
Filed June 7, 1937
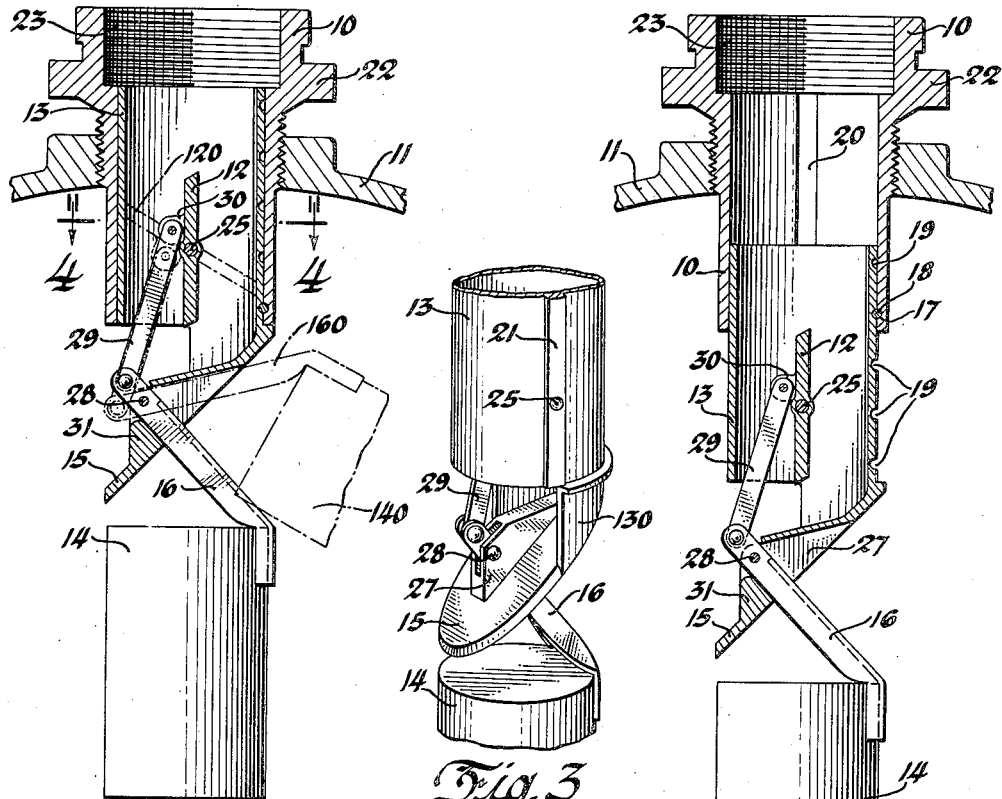
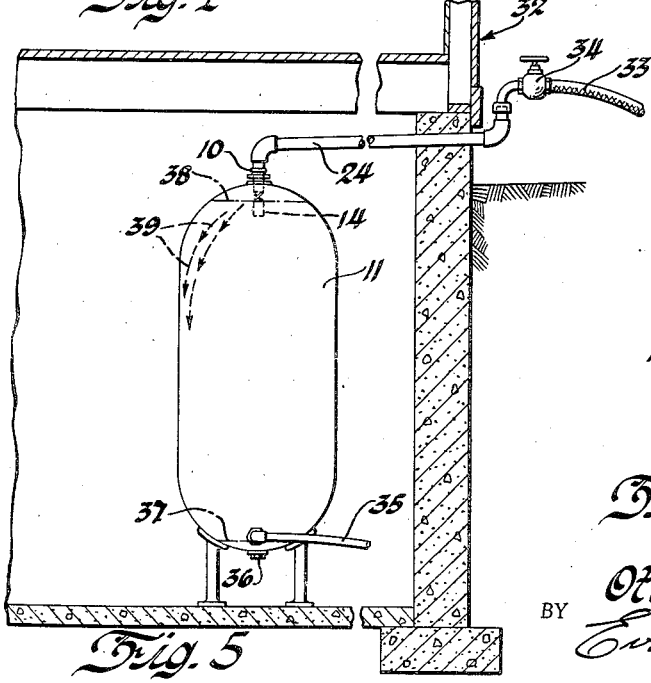
INVENTOR.
Otto A. Kottemann
BY Everett G. Wright
ATTORNEY.

Patented July 26, 1938

2,124,783

UNITED STATES PATENT OFFICE 2,124,783

HIGH LEVEL SAFETY CHECK

Otto A. Kottemann, Detroit, Mich.

Application June 7, 1937, Serial No. 146,813

6 Claims. (Cl. 137—104)

This invention relates to high level safety checks and in particular to safety checks adapted to close the inlet of storage tanks and the like during the filling thereof when fuel being placed therein rises to a predetermined level.

In the majority of instances domestic fuel storage tanks are located in the basement of a house or other structure heated by an oil burner, and fuel is supplied by gravity from the said fuel storage tank to the said oil burner. The fuel storage tank is usually filled from outside the said structure through a suitable fill line running from the said storage tank to a convenient point outside of the structure. The said fill line is normally sloped towards the storage tank to admit of fuel draining from the fill line into the tank after the tank is substantially filled. The said fuel storage tanks are usually vented by means of a vent line running from the top thereof to a suitable point outside the structure.

When filling a fuel storage tank from a fuel truck generally provided with means for pumping fuel through the delivery hose, the driver of the said fuel truck runs a delivery hose carried by the fuel truck to the end of the fill line located outside the structure housing the fuel storage tank. A valved nozzle is provided at the end of the delivery hose by means of which the driver regulates the flow of fuel from the fuel truck into the fill line. He then nozzles fuel under pressure into the fill line direct, or places a funnel in the end of the fill line and nozzles the fuel into the funnel, in either case the fuel gravitates through the fill line into the fuel storage tank within the structure.

When the fuel storage tank is filled or when the fuel being pumped from a fuel truck through the delivery hose thereof enters the fuel fill line or the funnel faster than the fuel fill line will carry the fuel by gravity to the fuel storage tank, the driver must manipulate the valved nozzle at the end of the delivery hose to prevent spillage. No matter how careful the driver might be, it is next to impossible to fill a fuel storage tank rapidly without spilling fuel at the end of the fuel fill line when nozzling fuel thereinto.

The driver of the fuel truck must watchfully wait for the fuel storage tank to fill up and shut off the flow of fuel through the delivery hose at the valved nozzle thereof when the fuel storage tank is filled. Much fuel delivery time is lost while the driver of the fuel truck is nozzling fuel into the fuel storage tank through the fuel fill line thereto, which time could be used in making out a delivery ticket or the like. Also, the present usual method of filling domestic fuel storage tanks by gravity flow from a manually regulated valved nozzle of a delivery hose through which fuel is pumped from a fuel truck is infinitely slower than the filling of a fuel storage tank under pressure from a fuel truck.

When filling a fuel storage tank under pressure, a pressure tight connection is made between the valved nozzle of the delivery hose and the fuel fill line. The fuel storage tank must then be provided with a positive acting high level safety check for automatically shutting off the pressure flow of fuel into the said tank, when fuel in the tank rises to a predetermined level, because if the high level safety check failed to function as the fuel storage tank was being filled under pressure, fuel would be pumped through the said storage tank and out the vent line therefrom.

The main object of this invention is to provide a high level safety check adapted to be positioned within a fuel storage tank and which will positively close the fill opening of the said tank when fuel being pumped therein rises to a predetermined level.

Another object of the invention is to provide a high level safety check adapted to prevent fuel entering the tank under pressure from interfering with or affecting in any manner the operation of the said high level safety check.

Another object of the invention is to provide a high level safety check for fuel storage tanks and the like which will operate with a minimum float pressure.

Another object of the invention is to provide a high level safety check suitably baffled to prevent fuel under pressure entering a storage tank equipped therewith from creating an unnecessary turbulence in the said tank thereby avoiding churning of sludge and foreign matter in the bottom of the said storage tank and the mixing thereof with the fuel entering the said storage tank.

Another object of the invention is to provide a high level safety check for storage tanks comprising a balanced pivoted float operated butterfly shut-off valve in which suitable baffling is provided to prevent oil entering a storage tank under pressure from affecting the operation of the float thereof.

Another object of the invention is to provide a baffled high level safety check for fuel storage tanks which prevents waves from being formed on the surface of the fuel in the tank during the filling thereof which permits the float of the said safety check to close the butterfly valve thereof gradually and without undue fluttering when the fuel therein reaches a predetermined level.

Another object of the invention is to provide a high level safety check so constructed as to require a minimum of lateral space for its float thereby admitting of its use in small diameter or narrow vertical type fuel storage tanks.

Another object of the invention is to provide a high level safety check adapted to be readily installed in an existing fuel storage tank with a minimum of labor and with substantially no change in the slope of the piping of the fill line thereto.

Another object of the invention is to provide a simple positive action high level safety check which is inexpensive to manufacture and which will require substantially no adjustment or service after installation.

Another object of the invention is to provide a high level safety check adapted to be easily and readily adjusted to various float levels with respect to the top of the oil storage tank into which it is installed.

Other objects of the invention will become apparent by reference to the following detailed description taken in connection with the accompanying drawing, in which:

Fig. 1 is a view part in section and part in elevation of a high level safety check embodying the invention shown installed in a fuel storage tank through the fill opening thereof.

Fig. 2 is a view part in section and part in elevation similar to Fig. 1 showing the high level safety check adjusted to a relatively low position with respect to the top of the fuel tank into which the same is installed.

Fig. 3 is a fragmentary elevational view in perspective showing the baffling of the high level safety check and the support for the float pivot formed integral therewith.

Fig. 4 is a horizontal sectional view taken on the line 4—4 of Fig. 1 showing the butterfly valve of the high level safety check in its closed position.

Fig. 5 is a more or less diagrammatic view showing a typical installation of a high level safety check.

Referring now to the drawing wherein like numerals refer to like and corresponding parts throughout the several views, the embodiment of the invention disclosed therein comprises, in general, a tank fitting 10 externally threaded into the inlet opening of a fuel storage tank 11, a butterfly valve 12 pivotally mounted in a sleeve 13 telescoped within the said tank fitting 10, a float 14 adapted to operate the said butterfly valve 12, and a baffle 15 preferably formed integral with the said sleeve 13 through which the float arm 16 of the said float 14 is pivoted and which prevents fuel entering the fuel storage tank 11 through the said sleeve 13 from interfering with the opening and closing of the said butterfly valve 12 by the said float 14.

The said tank fitting 10 is preferably provided with an annular bore 17 through the side thereof and near the depending end thereof to accommodate a cylindrical key 18 which engages the sleeve 13 at any one of a plurality of spaced arcuate grooves 19 cut in the side of the said sleeve 13, see Figs. 2 and 3. It will be observed that the height of the float 14 of the high level safety check may be readily adjusted with respect to the top of the fuel storage tank 11 by telescoping the sleeve 13 within the tank fitting 10 to the desired vertical adjusted position therein with one of the arcuate grooves 19 of the said sleeve 13 in alignment with the annular bore 17 of the tank fitting 10. The sleeve 13 is then keyed in the said desired vertical adjusted position by inserting the cylindrical key 18 in the annular bore 17 of the said tank fitting 10.

The inside of the said tank fitting 10 is preferably provided with diametrically opposite axially disposed grooves 20 for slidably receiving outer diametrically oppositely projecting bosses 21 on the said sleeve 13 which serve as guides for establishing the proper orientation of the said sleeve 13 within the said tank fitting 10 whereby to assure accurate radial registry of the grooves 19 of the said sleeve 13 with the annular bore 17 of the said tank fitting 10.

The top of the said tank fitting 10 is preferably provided with a hexagonal wrench grip 22 and is internally threaded at 23 by means of which the fill line piping 24 is connected thereto.

The butterfly valve 12 is pivotally mounted in the sleeve 13 on a diametrically disposed pivot pin 25 journaled through the wall of the said sleeve 13 preferably at the diametrically oppositely projecting bosses 21 thereof. The sides 26 of the butterfly valve 12 are preferably shaped as indicated in Fig. 4 to provide a bypass to permit fuel remaining in the fill line 24 after the butterfly valve 12 is closed to drain into the storage tank 11.

The baffle 15 formed integral with the said sleeve 13 is preferably disposed at an angle of about forty-five degrees downwardly therefrom, the uppermost half of the said baffle 15 being integrally connected to the depending semi-circular wall 130 of the said sleeve 13. The said baffle 15 is preferably provided with a central upwardly disposed hollow tongue 27 as best illustrated in Fig. 3 through which the float arm 16 brazed or otherwise secured to the said float 14 is pivoted on the pivot pin 28, the said float pivot pin 28 and the butterfly valve pivot pin 25 being disposed parallel to each other and normal to the said hollow tongue 27.

A link 29 is pivotally connected at its upper end to a lug 30 formed integral with the butterfly valve 25 eccentric to the pivotal axis thereof and is pivotally connected at its lower end to the upper end of the float arm 16 which projects upwardly through the said hollow tongue 27 of the said baffle 15. It is readily observed that any pivotal movement of the float arm 16 causes the butterfly valve 12 to pivot accordingly.

When the float 14 is in a substantially vertical position and the float arm 16 is pivoted about pivot pin 28 so as to permit the said float arm 16 to come to rest against the stop 31 formed in the lower end of the hollow tongue 27, the butterfly valve 12 is in its fully opened position as indicated by the full lines in Fig. 1. When fuel entering the fuel storage tank 11 rises to such a height therein as to cause the float 14 to rise to the position indicated by the dot and dash lines 140 in Fig. 1, the float arm 16 takes the position indicated by the dot and dash line 160 in Fig. 1 and the butterfly valve 12 is pivoted by the link 29 to its closed position as indicated by the dot and dash line 120.

Fig. 5 shows more or less diagrammatically a typical installation of a high level safety check in a fuel storage tank 11 located in the basement of a building 32 with a fuel fill line 24 running from the said storage tank 11 to a convenient point outside of the said building 32. A fuel truck delivery hose 33 having a valved nozzle 34 on the end thereof is shown connected to the inlet end of the fuel fill line 24 in such a manner as to make a pressure tight connection between the said delivery hose 33 and the fill line 24.

Fuel from the fuel storage tank 11 is generally piped to an oil burner or the like through an oil burner supply pipe 35 connected to the said fuel storage tank 11 near the bottom thereof. The bottom of the fuel storage tank 11 is provided with a suitable removable cleanout plug 36 through which sludge or other foreign matter which settles to the bottom of the said storage tank 11 may be removed at suitable intervals. It will be observed that the level of fuel in the fuel storage tank 11 will not drop below the dot and dash line 37 as indicated in Fig. 5 unless sludge is being cleaned from the bottom thereof.

The installation of high level safety checks into fuel storage tanks is very simple and comprises the threading of the tank fitting 10 of the high level safety check into the inlet opening at the top of the fuel storage tank 11 and the connecting of the fuel fill line piping 24 into the internally threaded upper end of the said tank fitting 10. Because of the fact that the high level safety check is positioned substantially entirely within the fuel storage tank 11, practically no change is required in the fill line piping and the slope thereof when the said high level safety check is installed in existing tanks. The height of the high level line 38 to which fuel entering the storage tank 11 is permitted to rise is regulated by adjusting the height of the float 14 of the high level safety check with respect to the top of the said fuel storage tank 11.

If the fuel fill line 24 to the fuel storage tank 11 is comparatively short, the sleeve 13 from which the float 14 of the high level safety check depends is completely telescoped within the tank fitting 10 as illustrated in Fig. 1 of the drawing. If the fuel fill line 24 is comparatively long, the said sleeve 13 from which the said float 14 of the high level safety check depends is only partially telescoped within the said tank fitting 10 as illustrated in Fig. 2. Thus the adjusted height of the float 14 of the high level safety check with respect to the top of the fuel storage tank 11 and the height of the high level line 38 to which the said fuel storage tank 11 is to be filled is established sufficiently below the top of the said fuel storage tank 11 to permit fuel remaining in the fill line 24 after the butterfly valve of the high level safety check has been closed to drain into the said fuel storage tank 11.

Fuel is preferably pumped from a fuel delivery truck through the fuel delivery hose 33 having a pressure tight connection to the fuel fill line 24 of the fuel storage tank 11. If an inspection plug at the top of the fuel storage tank 11 equipped with a high level safety check is removed or is not tightened there can be no overflow when filling the said tank because the high level safety check automatically closes the fill opening thereof as soon as fuel in the fuel storage tank rises to a predetermined level. Also, all outside spills or overflows at the fill end of the fill line to the fuel storage tank are eliminated because a pressure tight connection is used between the valved nozzle 34 of the delivery hose 33 of a fuel truck and the inlet end of the said fill line 24.

The high level safety check is so baffled as to cause fuel entering a storage tank therethrough to be sprayed against the side of the said tank as indicated by the arrows 39 in Fig. 5 rather than permitting fuel to enter the said storage tank in a solid high velocity stream. The mixing of sludge or other foreign matter which has settled to the bottom of a fuel storage tank with fuel being supplied or placed into the tank is thereby eliminated.

When fuel in the fuel storage tank rises to the pre-established high level as indicated by the dot and dash lines 38 in Fig. 5, the float 14 of the high level safety check pivots the butterfly valve 12 thereof to its closed position as indicated by the dot and dash line 120 in Fig. 1. The baffle 15 of the high level safety check prevents fuel entering a storage tank 11 under pressure from the fill hose 33 of a fuel truck from interfering with or disturbing in any manner the normal action and function of the float 14 of the said high level safety check.

When the butterfly valve 12 of the high level safety check is closed by the float 14 thereof, a back pressure in the fuel fill line and the delivery hose 33 causes fuel being pumped from a fuel delivery truck to bypass the pump carried by the said truck. The valve of the delivery nozzle 34 is then shut off and the pump on the fuel truck is stopped by the driver thereof. The valved nozzle 34 at the end of the fuel delivery hose 33 is then disconnected from the fuel fill line 24 and the fuel delivery hose is run back to the fuel delivery truck. Any fuel remaining in the fuel fill line 24 drains by gravity through the bypass provided at the butterfly 12 by shaping the sides 26 thereof as hereinbefore described.

When a high level safety check is used in a fuel storage tank, the said fuel storage tank may be filled to capacity at regular intervals by the driver of a fuel delivery truck whether the customer is home or not. No wasted stops are made by the fuel delivery truck inasmuch as the fuel storage tank may be filled to capacity from outside the building every time a fuel delivery truck calls at the premises of a customer. Each fuel delivery truck will make more deliveries per day and each customer will require fewer deliveries each season because the driver of a fuel delivery truck is not required to personally contact the customer when filling a fuel storage tank equipped with a high level safety check and because the fuel storage tank so equipped is filled to capacity at each delivery. It is estimated that the cost of delivering fuel oil per customer is reduced approximately twenty (20%) percent by the use of high level safety checks embodying the invention.

Although but one embodiment of the invention has been disclosed and described herein, it is to be understood that various changes including the size, shape, arrangement and detail of the parts thereof may be made without departing from the spirit of the invention and it is not intended to limit the scope thereof other than by the terms of the appended claims.

I claim:

1. A high level safety check for closing the inlet opening of a tank during the filling thereof when fluid placed therein rises to a predetermined level comprising a tubular inlet fitting adapted to be threaded into the inlet opening of said tank, a butterfly valve pivotally mounted in said fitting, a float pivotally depending from said fitting adapted to close said butterfly valve when fluid rising in said tank causes said float to pivot, a baffle between said butterfly valve and said float disposed with respect to said tubular inlet fitting so as to direct fluid entering said tank therethrough away from said float whereby to permit fluid rising in said tank to operate said valve free from the effect of fluid entering said tank under pressure through the inlet opening thereof, and a tongue upwardly disposed from said baffle supporting the pivot of said float adapted to limit the pivoting of the said butterfly valve to its full open position.

2. A high level safety check for closing the inlet opening of a tank during the filling thereof when fluid placed therein rises to a predetermined level comprising a tubular inlet fitting adapted to be threaded into the inlet opening of said tank, a butterfly valve pivotally mounted in said fitting, a baffle below said butterfly valve, a float, a pivot arm secured to said float pivoted through said baffle, a link connecting said pivot arm to said butterfly valve eccentric to its pivotal mounting, the said butterfly valve being in an open position when said float depends below said inlet fitting, the said baffle being disposed with respect to said tubular inlet fitting so as to direct fluid entering said tank therethrough away from said float whereby to permit fluid rising in said tank to operate said valve free from the effect of fluid entering said tank under pressure through the inlet opening thereof.

3. A high level safety check for closing the inlet opening of a tank during the filling thereof when fluid placed therein rises to a predetermined level comprising a tubular inlet fitting adapted to be threaded into the inlet opening of said tank, a sleeve telescoped in said inlet fitting, a butterfly valve pivotally mounted in said sleeve, a float pivotally depending from said sleeve adapted to close said butterfly valve when fluid rising in said tank causes said float to pivot, and a baffle integral with said sleeve disposed with respect to said sleeve so as to direct fluid entering said tank therethrough away from said float whereby to permit fluid rising in said tank to operate said valve free from the effect of fluid entering said tank under pressure through said sleeve.

4. A high level safety check for closing the inlet opening of a tank during the filling thereof when fluid placed therein rises to a predetermined level comprising a tubular inlet fitting adapted to be threaded into the inlet opening of said tank, a sleeve telescoped in said inlet fitting, a butterfly valve pivotally mounted in said sleeve, a baffle integral with said sleeve depending angularly therefrom, a float, a pivot arm secured to said float pivoted through said baffle, a link connecting said pivot arm to said butterfly valve eccentric to its pivotal mounting, the said butterfly valve being in an open position when said float depends below said sleeve, the said baffle being disposed with respect to said sleeve so as to direct fluid entering said tank therethrough away from said float and against a side of said tank whereby to permit fluid rising in said tank to be substantially free from turbulence and to operate said valve free from the effects of fluid entering said tank under pressure through the said sleeve.

5. A high level safety check for closing the inlet opening of a tank during the filling thereof when fluid placed therein rises to a predetermined level comprising a tubular inlet fitting adapted to be threaded into the inlet opening of said tank and connected to the end of a fill line generally sloped toward said tank from a point remote therefrom, a sleeve telescoped in said inlet fitting, a butterfly valve pivotally mounted in said sleeve, a float pivotally depending from said sleeve adapted to close said butterfly valve when fluid rising in said tank causes said float to pivot, the said butterfly valve being formed to permit fluid in said fill line to bypass said valve and drain into said tank after said valve is closed, the said sleeve being adapted to be telescopingly adjusted in said tubular inlet fitting whereby to regulate the level at which the float closes said valve with respect to the length of the said fill line to admit of the tank accommodating fluid remaining in said fill line when said valve is closed, and means for securing said sleeve in its adjusted telescoped position within said inlet fitting.

6. A high level safety check for closing the inlet opening of a tank during the filling thereof when fluid placed therein rises to a predetermined level comprising a tubular inlet fitting adapted to be threaded into the inlet opening of the said tank, a sleeve telescoped in said inlet fitting, a butterfly valve pivotally mounted in said sleeve, a float pivotally depending from said sleeve adapted to close the said butterfly valve when fluid rising in said tank causes said float to pivot, a baffle depending from said sleeve disposed with respect to said sleeve so as to direct fluid entering said tank therethrough away from said float whereby to permit fluid rising in said tank to operate said valve free from the effect of fluid entering the said tank under pressure through the said sleeve, and a tongue upwardly disposed from said baffle supporting the pivot of said float adapted to limit the pivoting of the said butterfly valve to its full open position.

OTTO A. KOTTEMANN.